United States Patent [19]

Teng et al.

[11] Patent Number: 5,077,386

[45] Date of Patent: Dec. 31, 1991

[54] PETROLEUM RESINS OF IMPROVED COLOR AND PROCESS FOR MAKING THE SAME

[75] Inventors: Harry H. Teng; Ray F. Murphy, both of Baton Rouge, La.

[73] Assignee: Exxon Chemical Patents Inc., Linden, N.J.

[21] Appl. No.: 547,411

[22] Filed: Jul. 2, 1990

Related U.S. Application Data

[63] Continuation of Ser. No. 191,924, May 9, 1988, abandoned.

[51] Int. Cl.$^5$ ............................ C08F 6/02; C08F 8/40
[52] U.S. Cl. .................... 528/487; 525/327.9; 525/340; 526/290; 526/237
[58] Field of Search ................. 525/327.9, 340; 528/487; 526/290, 237, 76

[56] References Cited

U.S. PATENT DOCUMENTS

| | | | |
|---|---|---|---|
| 2,115,564 | 4/1938 | Thomas et al. .............. | 528/487 X |
| 2,115,564 | 4/1938 | Thomas et al. .............. | 528/487 X |
| 2,585,867 | 2/1952 | Sparks et al. ............... | 526/237 X |
| 3,085,995 | 4/1963 | Kenney ....................... | 526/274 X |
| 3,085,995 | 4/1963 | Kenney ....................... | 260/80 |
| 3,746,654 | 7/1973 | Cottman ...................... | 252/400 A |
| 4,087,411 | 5/1978 | Sugio et al. ................. | 260/67 FP |
| 4,156,762 | 5/1979 | Kudo et al. .................. | 526/290 X |
| 4,156,762 | 5/1979 | Kudo et al. .................. | 526/76 |
| 4,391,961 | 7/1983 | Small et al. ................. | 526/76 |
| 4,419,503 | 12/1983 | Benitez et al. ............... | 526/237 |
| 4,514,554 | 4/1985 | Hughes et al. ................ | 526/339 |
| 4,558,107 | 12/1985 | Evans et al. .................. | 526/237 |
| 4,562,233 | 12/1985 | Small et al. ................. | 526/76 |
| 4,634,744 | 1/1987 | Hwang et al. ................ | 526/84 |
| 4,636,555 | 1/1987 | Luvinh et al. ................ | 526/290 |
| 4,684,707 | 8/1987 | Evans ........................... | 526/290 |
| 4,684,707 | 8/1987 | Evans et al. .................. | 526/290 |
| 4,714,749 | 12/1987 | Hughes et al. ................ | 526/290 |

FOREIGN PATENT DOCUMENTS

| | | |
|---|---|---|
| 53-067791 | 6/1978 | Japan . |
| 4014458 | 2/1979 | Japan . |
| 59-16431 | 9/1984 | Japan . |

*Primary Examiner*—Fred Teskin
*Attorney, Agent, or Firm*—John F. Hunt; T. Dean Simmons

[57] ABSTRACT

An petroleum resin of improved color and process for making the same are provided. The improvement in color is the result of a "dry" quench process, in which the polymerizate of an olefinic, diolefinic, aromatic or mixed hydrocarbon feedstock polymerized in the presence of a Friedel-Crafts catalyst is quenched by admixing the polyemrizate with a phosphite instead of the familiar water wash quenching procedure.

26 Claims, 1 Drawing Sheet

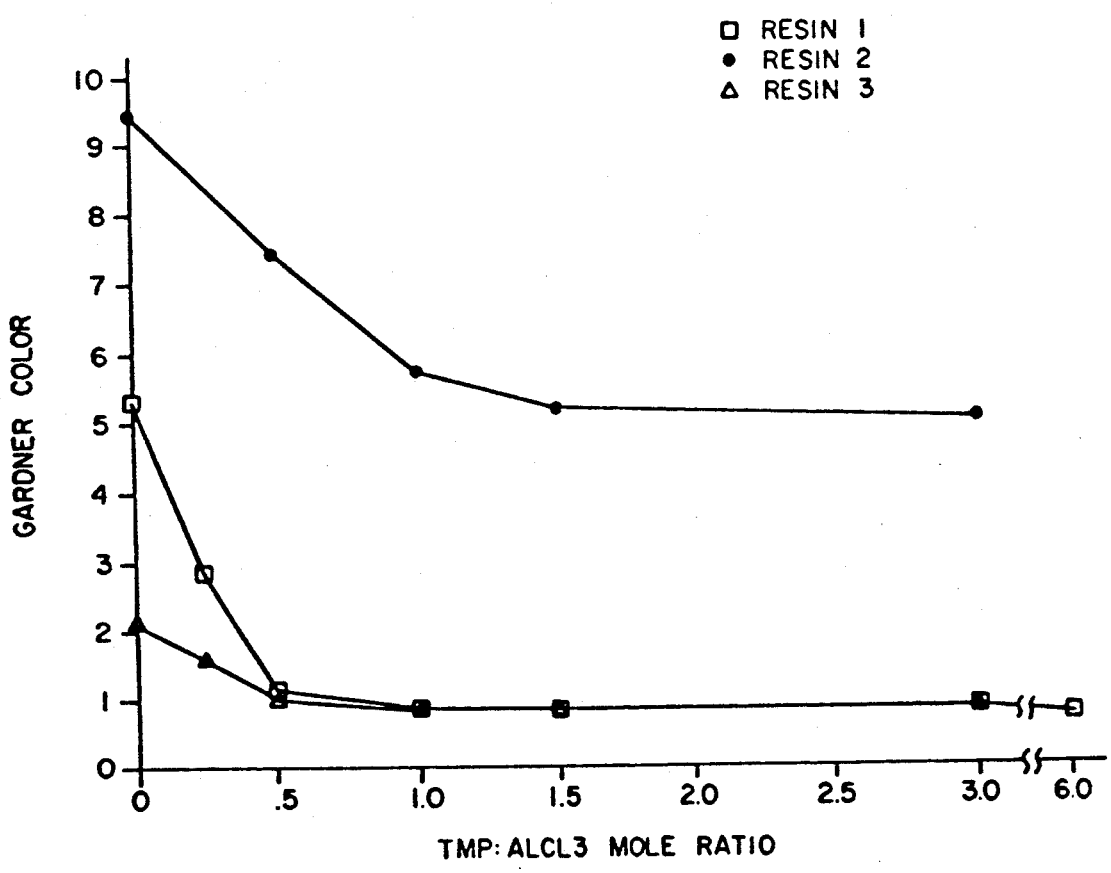

PETROLEUM RESINS OF IMPROVED COLOR AND PROCSS FOR MAKING THE SAME

This is a continuation of application Ser. No. 191,924, filed May 9, 1988, now abandoned.

BACKGROUND OF THE INVENTION

The present invention relates generally to petroleum resins suitable as tackifiers for adhesive formulations and methods for their production. More particularly, the present invention relates to a novel quenching procedure which results in a petroleum resin having improved color properties.

The present invention is primarily concerned with petroleum resins derived from aliphatic monomers, aromatic monomers and mixtures thereof. These petroleum resins are well-known in the art and are described in numerous patents and publications such as, for example, U.S. Pat. Nos. 4,391,961; 4,419,503; 4,514,554; 4,558,107; 4,562,233; 4,636,555; 4,684,707; and 4,714,749. All of these patents are incorporated by reference for all purposes as if fully set forth.

Petroleum resins are generally produced by polymerizing olefinic, diolefinic, aromatic and/or mixed feedstocks in the presence of a Friedel-Crafts catalyst, usually an aluminum chloride or boron triflouride, at temperatures of between about −40° C. to about 100° C. and pressures ranging from atmospheric up to about 100 psig.

As a key step in the above process, the resulting polymerizate is quenched to deactivate the active catalyst residue and convert the catalyst to a more easily removable form. Prior art quenching procedures involve the washing of the polymerizate with large volumes of water or combinations of water and an alcohol or alkali solution to deactivate and remove the catalyst from the polymerizate. Such quenching procedures are more fully taught in the aforementioned incorporated patents.

The water wash ("wet") quenching procedures, however, often result in dark colored products. Additionally, the large volumes of water utilized in the quench procedures, generally on the order of about 10% to about 200% of the polymerizate, results in substantial treatment and disposal problems.

The present invention overcomes these shortcomings by utilizing a "dry" quench procedure involving the addition of minor amounts of a phosphite to the petroleum resin polymerizate as more fully described below.

SUMMARY OF THE INVENTION

The present invention provides a quench process for the production of petroleum resins which results in a lighter colored product.

The present invention also provides a quench process for the production of petroleum resins which can alleviate many of the wastewater treatment and disposal problems of prior art water wash quenching procedures.

The present invention finally provides an improved color petroleum resin produced by the quench process as described below.

In accordance with the present invention, a process for quenching a polymerizate of a hydrocarbon feedstock polymerized in the presence of a Friedel-Crafts catalyst is provided which, in its overall concept, comprises the step of admixing the polymerizate with an effective amount of a phosphite. The phosphite and polymerizate are agitated for a time sufficient to promote the reaction or to react with each other after which time the polymerizate may be water washed and/or otherwise treated in a manner familiar in the art to clean, separate and recover the resulting petroleum resin. The water wash, no longer required to deactivate and remove the residual catalyst, becomes an optional step. By omitting the water wash and filtering the phosphite-treated polymerizate, the aforementioned wastewater treatment and disposal problems can be substantially alleviated.

The phosphite may be added to the polymerizate over a broad range of proportions so long as the quenching is sufficient. Of course, this depends upon the particular resin and phosphite chosen. Conveniently, the phosphite is added to the polymerizate preferably in amounts ranging from about 0.05 to about 6.0, more preferably from about 0.25 to about 5.0, most preferably from about 0.25 to about 3.0, moles of phosphite per mole of the Friedel-Crafts catalyst utilized for the polymerization.

Phosphites suitable for use with the present invention are those of the general formula $P(OR)(OR_1)(OR_2)$, wherein R, $R_1$ and $R_2$ are selected from hydrogen or a hydrocarbon group having from 1 to 20 carbon atoms, and wherein at least one of R, $R_1$ or $R_2$ is such a hydrocarbon group. Particularly preferred are those phosphites wherein R, $R_1$ and $R_2$ are the same hydrocarbon group. Also particularly preferred are those phosphites wherein the hydrocarbon groups have from 1 to 6 carbon atoms.

The "dry" quench procedure utilizing the phosphite in accordance with the present invention produces a petroleum resin of improved color properties over its water washed counterpart. The improved color petroleum resins of the present invention, as a by-product of the quench reaction, will also include minor amounts of a resin chain having the following general formula:

wherein $R_3$ comprises a petroleum resin chain, and wherein $R_4$ and $R_5$ are selected from hydrogen or a hydrocarbon group having from 1 to 20 carbon atoms, more preferably from 1 to 6 carbon atoms.

These and other features and advantages of the present invention will be more readily understood by those skilled in the art from a reading of the following detailed description with reference to the accompanying drawing.

BRIEF DESCRIPTION OF THE DRAWING

FIG. 1 is a graphical representation of the measured Gardner colors for various petroleum resins as described below in Examples 12–25.

DETAILED DESCRIPTION OF THE PREFERRED EMBODIMENT

As mentioned earlier, the petroleum resins of the present invention are produced by polymerizing olefinic, diolefinic, aromatic and mixed feedstocks in the presence of a Friedel-Crafts catalyst in any one of a number of well-known polymerization reactions. The result is an aliphatic, aromatic or mixed character petroleum resin. The various hydrocarbon feedstocks and reaction conditions are described in detail in the aforementioned incorporated patents, and reference may be had to them for greater detail other than provided herein.

Briefly, the hydrocarbon feedstocks are generally obtained by steam cracking kerosene, gas oil, naphtha and other light refinery streams at elevated temperatures and pressures. Ethylene and propylene are prominent components of these steam cracked refinery streams, which also may contain higher molecular weight hydrocarbons such as, for example, butenes, pentenes, hexenes, naphthenes, aromatics and other cyclic and acyclic hydrocarbons of increasing molecular weights. The various fractions are generally distilled into groups with similar boiling points.

The petroleum resins of the present invention are produced by (co)polymerizing these steam cracked distillates, predominately the $C_5$ to $C_9$ fractions, in the presence of from about 0.25% to about 2.5% by weight of a Friedel-Crafts type catalyst such as, for example, an aluminum chloride, aluminum bromide, boron triflouride and the like, or solutions, complexes or slurries thereof. An especially preferred Friedel-Crafts catalyst is aluminum trichloride ($AlCl_3$). The (co)polymerization reactions are carried out at temperatures ranging from about $-40°$ C. to about $100°$ C. and pressures ranging from atmospheric up to about 100 psig for from about 0.5 hours to about 3 hours. Of course, the temperatures, pressures and times may vary depending upon the initial feedstocks and desired characteristics of the final resin; however, these parameters are easily determinable by one skilled in the art.

In accordance with the present invention, the resulting polymerizate from the copolymerization reaction is then quenched by admixing the polymerizate with an effective amount of a phosphite of the general formula $P(OR)(OR_1)(OR_2)$, wherein R, $R_1$ and $R_2$ are selected form hydrogen or a hydrocarbon group, and wherein at least one of R, $R_1$ or $R_2$ is such a hydrocarbon group. The hydrocarbon group preferably has from 1 to 20 carbon atoms, more preferably from 1 to 6 carbon atoms. Particularly preferred are those phosphites wherein R, $R_1$ and $R_2$ comprise the same hydrocarbon group.

Suitable phosphites include, for example, trimethyl phosphite, triethyl phosphite. tris(2-ethylhexyl)phosphite, tributyl phosphite, triisooctyl phosphite, triisopropyl phosphite, triphenyl phosphite and dimethyl phosphite. Especially preferred is trimethyl phosphite.

The phosphites are preferably utilized in amounts ranging from about 0.05 to about 6.0, more preferably from about 0.25 to about 5.0, most preferably between about 0.25 to about 3.0, moles of phosphite per mole of Friedel-Crafts catalyst utilized in the (co)polymerization reaction. The phosphite, preferably in liquid form, is added to the polymerizate and the two admixed for a time sufficient for the phosphite to react with the catalyst, generally on the order of from about 0.5 minutes to about 60 minutes, more preferably from about 0.5 minutes to about 20 minutes. The resulting quenched polymerizate may then be processed in a manner familiar in the art such as, for example, filtration and/or centrifugation, to produce the finished petroleum resin.

As an optional subsequent step, the phosphite quenched polymerizate may be water washed in the manner familiar to the art. This water wash step, however, is no longer necessary and may be omitted if desired, saving wastewater treatment and processing costs.

As a result of this quenching procedure, a petroleum resin of improved color properties is produced. Also, by some unknown mechanism, the phosphite reacts with a resin polymer chain to produce a minor amount of a resin chain having the following general formula:

wherein $R_3$ comprises the petroleum resin chain (aliphatic, aromatic and/or a mixture of both), and wherein $R_4$ and $R_5$ are selected from hydrogen or a hydrocarbon group, preferably the same hydrocarbon group. The hydrocarbon group, as mentioned before, preferably has from 1 to 20 carbon atoms, more preferably from about 1 to 6 carbon atoms. The aliphatic, aromatic and mixed aliphatic/aromatic petroleum resins of the present invention, therefore, will contain minor amounts of this resin chain.

The use of the aforedescribed phosphites in the quench process of the present invention does not appear to substantially affect any of the properties of the petroleum resin other than the color which, as demonstrated below, is significantly lightened.

The foregoing more general discussion of this invention will be further exemplified by the following specific examples and comparative example offered by way of illustration and not limitation of the above-described invention.

EXAMPLES

A series of phosphite compounds was tested as quench agents to determine their effect on the color of various aliphatic and aromatic petroleum resins. The results are presented in Table IV. A general procedure for the tests is described below.

From 900–1000 g of a $C_5$ to $C_9$ hydrocarbon feedstock was polymerized in a batch reactor in the presence of a Friedel-Crafts catalyst comprising either $AlCl_3$ or $BF_3$. Before polymerization, the catalyst in solution or slurry form was first introduced into the batch reactor which was maintained clean and moisture free under a blanket of dry nitrogen gas.

When $AlCl_3$ was used as the catalyst, anhydrous $AlCl_3$ was mixed with a solvent such as benzene or toluene under constant stirring to form a uniform slurry. The amounts of $AlCl_3$ and solvent making up the slurry were 0.5–1.0 and 5 wt %. respectively, of the total polymerization batch. When $BF_3$ was used as the catalyst, a commercial etheral solution of $BF_3$ (available from Aldrich Chemical Company, 1988 Catalog No. 17550-1) was directly injected into the batch reactor. The amount of etheral $BF_3$ used was similar to that of $AlCl_3$.

To start the polymerization, the hydrocarbon feedstock was pumped into the reactor that contained the catalyst solution or slurry. Polymerization occurred immediately when the hydrocarbon was in contact with the catalyst, as evidenced by the evolution of heat and the appearance of the characteristic red color of the polymerizate. The feed pump was set at such a rate that the addition of the total desired amount of feedstock was completed in 30 minutes. During this 30 minute time period, the reactor was maintained at a temperature of 40.5° C. and a pressure of atmospheric up to 30 psig. Without changing the reaction conditions or adding additional feedstock, the polymerization was allowed to continue for an additional 30 minute heat-soaking period. At the end of the heat-soaking period, the red-colored polymerizate was divided into two or more portions for the particular quenching experiment.

A first portion, utilized as a control, was quenched with an equal volume of water or water-isopropanol mixture (4:1 to 1:1). The organic layer was separated from the aqueous layer and washed with an equal volume of water. After again separating the organic layer from the aqueous layer, the polymerization was stripped first with nitrogen then with steam. Nitrogen stripping, designed to remove all unreacted molecules, was carried out by passing nitrogen gas through the polymerizate while the polymerizate was gradually heated from room temperature up to 250° C. Steam at 250° C. was then passed through the polymerizate to further remove the undesired low molecular weight oligomers. The color of the finished resin was measured using a Hunter Lab Model D25 Optical Sensor expressed in Gardner units.

A second portion was quenched with a particular phosphite in accordance with the methods of the present invention. A predetermined amount of this phosphite was added to about 400 grams of the second portion, and the mixture was stirred for about 1 to about 40 minutes. Various phosphite/catalyst molar ratios were tested.

When the phosphite was utilized, it was noticed that the polymerizate became light in color and a complex was formed as a result of the quench reaction. The resulting polymerizate was separated from the sludge-like complex by centrifugation and/or filtration, then stripped and finished as described above. As an option in some examples, the phosphite-quenched polymerizate was subsequently water-washed as described above before finishing. The color of the finished resin was measured as with the control.

These abbreviations as set forth in Table IV below have the following meaning:

TMP—trimethyl phosphite
TEP—triethyl phosphite
TEHP—tris(2-ethylhexyl) phosphite
TBP—tributyl phosphite
TIOP—triisooctyl phosphite
TIPP—triisopropyl phosphite
TPP—triphenyl phosphite
DMP—dimethyl phosphite
TEPA—triethyl phosphate
WW—water washing
QA—quench agent RESIN 1—an aromatic petroleum resin produced from premium (desulfurized) $C_9$ hydrocarbon feedstock. The actual feedstock utilized is a plant stream of varying composition. A typical composition is set forth below in Table I.

TABLE I

| Active Component | Weight % |
| --- | --- |
| Styrene | 4%–10% |
| a-Methylstyrene | 1%–5% |
| m-Methylstyrene | 7%–15% |
| o-Methylstyrene | 1%–5% |
| p-Methylstyrene | 2%–10% |
| B-Methylstyrene | 1%–7% |
| Indene | 7%–15% |
| Divinylbenzene | 0%–5% |
| Methylindenes | 0%–10% |

RESIN 2—another aromatic petroleum resin produced from regular (non-desulfurized) $C_9$ hydrocarbon feedstock, the composition of which is essentially the same as set forth in Table I.

RESIN 3—an aliphatic petroleum resin produced from $C_5$ to $C_6$ fraction having a boiling point of 22° C. to 65° C. The actual $C_5$ to $C_6$ feedstock utilized is a plant stream of varying composition. A typical composition is set forth in Table II below.

TABLE II

| Active Component | Weight % |
| --- | --- |
| 2-Methylbutane | 29% |
| 2-Methyl-1-butene | 4% |
| Isoprene | 1% |
| 2-Methyl-2-butene | 19% |
| Cyclopentadiene | 1% |
| Cis/trans 1,3-pentadiene | 20% |
| Cyclopentene | 7% |
| Other C5/C6 Olefins | 13% |
| Other Alkanes | 7% |

RESIN 4—a petroleum resin produced from a mixture of aliphatic and aromatic hydrocarbon feedstocks, such as those set forth in Tables I and II above. A typical composition is set forth in Table III below.

TABLE III

| Active Component | Weight % |
| --- | --- |
| 2-Methyl-2-butene | 1%–4% |
| Cis/trans 1,3-pentadiene | 5%–15% |
| Cyclopentene | 3%–10% |
| Styrene | 4%–8% |
| a-Methylstyrene | 1%–4% |
| m-Methylstyrene | 5%–12% |
| o-Methylstyrene | 1%–4% |
| p-Methylstyrene | 1%–8% |
| B-Methylstyrene | 1%–6% |
| Indene | 5%–12% |

TABLE IV

| Ex. | Resin | QA | QA/Cat Molar Ratio | Gardner Color Control | Gardner Color Quenched | Change |
| --- | --- | --- | --- | --- | --- | --- |
| 1 | 1 | TMP | 1.5 | 5.3 | 0.8 | −4.5 |
| 2 | 1 | TEP | 1.5 | 4.7 | 0.8 | −3.9 |
| 3 | 1 | TMP + WW | 1.5 | 4.7 | 1.3 | −3.4 |
| 4 | 1 | TEHP | 1.5 | 4.7 | 1.4 | −3.3 |
| 5 | 1 | TBP | 1.5 | 4.7 | 1.6 | −3.1 |
| 6 | 1 | TIOP | 1.5 | 4.7 | 1.6 | −3.1 |
| 7 | 1 | TIPP | 1.5 | 4.7 | 2.3 | −2.4 |
| 8 | 1 | TPP | 1.5 | 4.8 | 2.8 | −2.0 |
| 9 | 1 | DMP | 1.5 | 5.5 | 4.8 | −0.7 |
| C1 | 1 | TEPA | 1.5 | 4.7 | 6.0 | +1.3 |
| 10 | 2 | TPP | 1.5 | 9.4 | 7.6 | −1.8 |
| 11 | 3 | TPP | 1.5 | 2.1 | 1.4 | −0.7 |
| 12 | 1 | TMP | 0.25 | 5.3 | 2.8 | −2.5 |
| 13 | 1 | TMP | 0.5 | 5.3 | 1.1 | −4.2 |
| 14 | 1 | TMP | 1.0 | 5.3 | 0.8 | −4.5 |
| 15 | 1 | TMP | 3.0 | 5.3 | 0.8 | −4.5 |
| 16 | 1 | TMP | 6.0 | 5.3 | 0.7 | −4.6 |
| 17 | 2 | TMP | 0.5 | 9.4 | 7.4 | −2.0 |
| 18 | 2 | TMP | 1.0 | 9.4 | 5.7 | −3.7 |
| 19 | 2 | TMP | 1.5 | 9.4 | 5.2 | −4.2 |
| 20 | 2 | TMP | 3.0 | 9.4 | 5.0 | −4.4 |
| 21 | 3 | TMP | 0.25 | 2.1 | 1.6 | −0.5 |
| 22 | 3 | TMP | 0.5 | 2.1 | 1.0 | −1.1 |
| 23 | 3 | TMP | 1.0 | 2.1 | 0.8 | −1.3 |
| 24 | 3 | TMP | 1.5 | 2.1 | 0.8 | −1.3 |
| 25 | 3 | TMP | 3.0 | 2.1 | 0.8 | −1.3 |
| 26 | 1 | DMP | 1.0 | 5.5 | 5.1 | −0.4 |
| 27 | 1 | DMP | 3.0 | 5.5 | 4.8 | −0.7 |
| 28 | 4 | TMP + WW | 0.5 | 7.5 | 5.0 | −2.5 |
| 29 | 4 | TMP + WW | 1.5 | 7.3 | 4.1 | −3.2 |
| 30 | 1 | TMP | 0.5 | 4.6 | 2.0 | −2.6 |
| 31 | 1 | TMP + WW | 0.5 | 4.6 | 2.6 | −2.0 |

EXAMPLES 1-9 and C1

Nine different quench agents including seven trialkyl phosphites (1-8), one dialkyl phosphite (9) and one trialkyl phosphate (C1) were tested to determine their effect on the premium aromatic resin designated as RESIN 1. The results are presented above in Table IV.

The tests were conducted following the general procedure described above. Thus, 900 grams of hydrocarbon feedstock was polymerized at 40° C. under an atmosphere of nitrogen in the presence of 0.5% $AlCl_3$ catalyst. A 400 gram portion of the resulting polymerizate was water-washed, stripped and finished. This portion was used as the control.

For Example 1, another 400 gram portion of the polymerizate was treated with 2.8 grams of TMP which was equivalent to 1.5 moles of TMP per mole $AlCl_3$ used in the polymerization. During the treatment, the TMP/polymerizate mixture was stirred for about 20 minutes to promote the reaction. After centrifuging and filtering, the resulting polymerizate was stripped and finished.

The same procedure was repeated for Examples 2, 4-9 and C1 to test the effects of other quench agent. In Example 3, a water-washing step was included subsequent to the quench step.

The results as presented in Table IV clearly show the positive (lightening) effects on the color of petroleum resins when a phosphite is utilized as the quenching agent. In fact, the only negative result in color change appears in the Comparative Example (C1) which utilizes a phosphate instead of a phosphite. Phosphates, of course, are phosphorous compounds but outside the scope of the phosphites of the present invention. In other words, the Comparative Example (C1) shows that not all phosphorous compounds give the positive color results as with the use of phosphites in accordance with the present invention.

EXAMPLE 10 and 11

In these examples, TPP was tested as a quench agent for RESINS 2 and 3. RESINS 2 and 3 were produced as above for RESIN 1, except that RESIN 3 was polymerized with 0.6% $AlCl_3$ catalyst under 12 psig nitrogen pressure.

These examples, together with Example 8, show that the phosphite quench in accordance with the present invention is effective in reducing the Gardner color of resins of different types and grades.

EXAMPLES 12-25

As can be seen from Table IV, and as graphically depicted in FIG. 1, these examples demonstrate the effectiveness of TMP as a quench agent for different resins (RESINS 1, 2 and 3) at varying concentration levels.

EXAMPLES 26 and 27

In these examples, DMP was tested on RESIN 1 at two concentration levels by the same procedure as in Example 9. Although apparently less effective than the trialkyl phosphites of Examples 1, 2 and 4-8, DMP was demonstrated to improve resin color when utilized as the quench agent.

EXAMPLES 28 and 29

As seen in Example 3, quenching the polymerizate with TMP followed by a water washing step proved effective in reducing the color of RESIN 1. RESIN 4, utilized in this example, was produced from a mixture of $C_5$ and $C_9$ feedstocks and polymerized by the same procedure as described in Example 10 or 11. The quench procedure was similar to that of Example 3 except that a lower TMP concentration was used in the present example.

As demonstrated by the results presented in Table IV, the color of RESIN 4 was significantly improved by the aforedescribed TMP plus water wash quench procedure in accordance with the present invention.

EXAMPLES 30 AND 31

In these examples, RESIN 1 was polymerized as before except that etheral $BF_3$ was used instead of $AlCl_3$. The amount of etheral $BF_3$ used was approximately equal to the amounts of $AlCl_3$ used in earlier examples. The polymerizates were quenched with TMP (Ex. 30) and TMP plus water washing (Ex. 1) as described before.

As shown in Table IV, the quenching of $BF_3$ catalyzed polymerizations in accordance with the procedures of the present invention also proved quite effective in reducing resin color.

Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation on the scope thereof.

Given below are two additional examples describing the resin aged color improvement due to the phosphite-quenching process in this invention.

EXAMPLE 32

A control sample and a phosphite-quenched sample of RESIN 1 were aged by being heat treated in a furnace at 175° C. for 16 hours. RESIN 1 is a C9 (or aromatic) resin described in Example 1. The aged color turned out to be 15.8 Gardner for the control and 10.4 Gardner for the quenched resin. The lighter aged resin color is, in fact, the result of using the phosphite-quenching process in the present invention.

EXAMPLE 33

As an additional example, RESIN 3, a C5 (or aliphatic) resin described in Example 24 was heat treated in the same manner. The lighter aged color of 10.4 Gardner observed for the quenched resin compared to the aged control color of 12.2 Gardner confirms the resin color improvement by this invention.

We claim:

1. A process for quenching a polymerizate of a steam cracked distillate polymerized in the presence of a Friedel-Crafts catalyst, comprising the step of admixing said polymerizate with an effective amount of a phosphite of the general formula $P(OR)(OR_1)(OR_2)$, wherein R, $R_1$ and $R_2$ are selected from hydrogen or a hydrocarbon group, and wherein at least one of R, $R_1$ or $R_2$ comprises said hydrocarbon group.

2. The process of claim 1, wherein said hydrocarbon group comprises from 1 to 20 carbon atoms.

3. The process of claim 2, wherein said hydrocarbon group comprises from 1 to 6 carbon atoms.

4. The process of claim 1, wherein R, $R_1$ and $R_2$ are the same said hydrocarbon group.

5. The process of claim 1, wherein said admixing step comprises the step of admixing said polymerizate with from about 0.05 to about 6.0 moles of said phosphite per mole of said Friedel-Crafts catalyst.

6. The process of claim 5, wherein said admixing step comprises the step of admixing said polymerizate with from about 0.05 to about 5.0 moles of said phosphite per mole of said Friedel-Crafts catalyst.

7. The process of claim 6, wherein said admixing step comprises the step of admixing said polymerizate with from about 0.05 to about 3.0 moles of said phosphite per mole of said Friedel-Crafts catalyst.

8. The process of claim 1, wherein said admixing step comprises the step of admixing said polymerizate with said phosphite for a time sufficient to react with substantially all of said Friedel-Crafts catalyst.

9. The process of claim 8, wherein said polymerizate and said phosphite are admixed for from about 0.5 minutes to about 60 minutes.

10. The process of claim 9, wherein said polymerizate and said phosphite are admixed for from about 0.5 minutes to about 20 minutes.

11. The process of claim 1, wherein said polymerizate is produced by the polymerization of said steam cracked distillate in the presence of said Friedel-Crafts catalyst, said steam cracked distillate comprising an olefin, diolefin, aromatic or mixture thereof.

12. The process of claim 1, wherein said Friedel-Crafts catalyst comprises a boron triflouride.

13. A process for producing a petroleum resin of improved color quality, comprising the steps of:
   polymerizing a steam cracked distillate in the presence of a Friedel-Crafts catalyst to produce a polymerizate, said steam cracked distillate comprising an olefin, diolefin, aromatic or mixture thereof; and
   quenching said polymerizate with a phosphite of the general formula $P(OR)(OR_1)(OR_2)$, wherein R, $R_1$ and $R_2$ are the same or different of hydrogen or a hydrocarbon group, and wherein at least one of R, $R_1$ or $R_2$ comprises said hydrocarbon group.

14. The process of claim 13, wherein said hydrocarbon group comprises from 1 to 20 carbon atoms.

15. The process of claim 14, wherein said hydrocarbon group comprises from 1 to 6 carbon atoms.

16. The process of claim 14, wherein R, $R_1$ and $R_2$ are the same said hydrocarbon group.

17. The process of claim 13, wherein said quenching step comprises the step of admixing said polymerizate with from about 0.05 to about 6.0 moles of said phosphite per mole of said Friedel-Crafts catalyst.

18. The process of claim 17, wherein said quenching step comprises the step of admixing said polymerizate with from about 0.05 to about 5.0 moles of said phosphite per mole of said Friedel-Crafts catalyst.

19. The process of claim 18, wherein said quenching step comprises the step of admixing said polymerizate with from about 0.05 to about 3.0 moles of said phosphite per mole of said Friedel-Crafts catalyst.

20. The process of claim 13, wherein said quenching step comprises the step of admixing said polymerizate with said phosphite for a time sufficient to react with substantially all of said Friedel-Crafts catalyst.

21. The process of claim 20, wherein said polymerizate and said phosphite are admixed for from about 0.5 minutes to about 60 minutes.

22. The process of claim 21, wherein said polymerizate and said phosphite are admixed for from about 0.5 minutes to about 20 minutes.

23. The process of claim 13, wherein said Friedel-Crafts catalyst comprises a boron triflouride.

24. The petroleum resin produced by the process of claim 17.

25. A process for quenching a polymerizate of a steam cracked distillate polymerized in the presence of an aluminum chloride catalyst, comprising the step of admixing said polymerizate with an effective amount of a phosphite of the general formula $P(OR)(OR_1)(OR_2)$, wherein R, $R_1$ and $R_2$ are selected from hydrogen or a hydrocarbon group, and wherein at least one of R, $R_1$ or $R_2$ comprises said hydrocarbon group.

26. A process for producing a petroleum resin of improved color quality, comprising the steps of:
   polymerizing a steam cracked distillate in the presence of an aluminum chloride catalyst to produce a polymerizate, said steam cracked distillate comprising an olefin, diolefin, aromatic or mixture thereof; and
   quenching said polymerizate with a phosphite of the general formula $P(OR)(OR_1)(OR_2)$, wherein R, $R_1$ and $R_2$ are the same or different of hydrogen or a hydrocarbon group, and wherein at least one of R, $R_1$ or $R_2$ comprises said hydrocarbon group.

* * * * *